United States Patent
Honda et al.

(10) Patent No.: US 8,449,978 B2
(45) Date of Patent: May 28, 2013

(54) INSULATED WIRE AND INSULATING VARNISH USED THEREFOR

(75) Inventors: Yuki Honda, Hitachi (JP); Tomiya Abe, Hitachi (JP); Hideyuki Kikuchi, Hitachi (JP)

(73) Assignees: Hitachi Cable, Ltd., Tokyo (JP); Hitachi Magnet Wire Corp., Ibaraki (JP)

( * ) Notice: Subject to any disclaimer, the term of this patent is extended or adjusted under 35 U.S.C. 154(b) by 934 days.

(21) Appl. No.: 12/211,553

(22) Filed: Sep. 16, 2008

(65) Prior Publication Data

US 2009/0202831 A1    Aug. 13, 2009

(30) Foreign Application Priority Data

Feb. 13, 2008    (JP) ................. 2008-032148

(51) Int. Cl.
*D02G 3/00*    (2006.01)
*H01B 3/30*    (2006.01)

(52) U.S. Cl.
USPC ........ 428/379; 428/375; 428/383; 174/110 R; 174/110 SR; 174/120 R; 528/289; 528/310; 528/323

(58) Field of Classification Search
None
See application file for complete search history.

(56) References Cited

U.S. PATENT DOCUMENTS

| | | | |
|---|---|---|---|
| 3,563,951 A * | 2/1971 | Radlmann et al. | 528/26 |
| 3,634,304 A * | 1/1972 | Suzuki et al. | 524/323 |
| 3,661,849 A * | 5/1972 | Culbertson | 528/187 |
| 3,666,709 A * | 5/1972 | Suzuki et al. | 524/323 |
| 4,163,030 A * | 7/1979 | Banucci et al. | 525/429 |
| 4,576,857 A * | 3/1986 | Gannett et al. | 442/63 |

(Continued)

FOREIGN PATENT DOCUMENTS

EP    1266926 A1 * 12/2002
EP    1642919 A1 * 4/2006

(Continued)

OTHER PUBLICATIONS

Japanese Official Action mailed Nov. 13, 2012 in Japanese counterpart, Japanese Patent Application No. 2008-232111, together with an English language translation.

*Primary Examiner* — Jill Gray
(74) *Attorney, Agent, or Firm* — Scully, Scott, Murphy & Presser, P.C.

(57) ABSTRACT

An insulated wire including a conductor, and an insulating film formed by coating and baking an insulating varnish on the conductor directly or via another insulation layer. The insulating varnish includes a phenolic hydroxyl group-containing polyimide resin represented by a chemical formula (1):

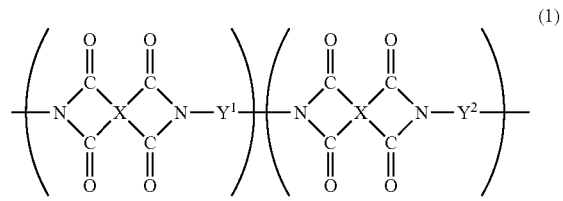

(1)

where X is a tetravalent aromatic group composing an aromatic tetracarboxylic dianhydride residue, $Y^1$ is a divalent aromatic group including one or more phenolic hydroxyl groups and $Y^2$ is a divalent aromatic group not including a phenolic hydroxyl group A ratio of the number $Z1$ of phenolic hydroxyl groups included in $Y^1$ of the chemical formula (1) to the number $Z2$ of an imide group included in the chemical formula (1) is $0.15 \leq Z1/Z2 \leq 0.85$.

6 Claims, 1 Drawing Sheet

U.S. PATENT DOCUMENTS

| | | | | |
|---|---|---|---|---|
| 4,927,736 A * | 5/1990 | Mueller et al. | 430/275.1 |
| 5,288,588 A * | 2/1994 | Yukawa et al. | 430/192 |
| 5,578,697 A * | 11/1996 | Kawamonzen et al. | 528/353 |
| 6,956,100 B2 * | 10/2005 | Imaizumi et al. | 528/310 |
| 7,678,874 B2 * | 3/2010 | Sugo et al. | 528/170 |
| 7,683,152 B2 * | 3/2010 | Akiba et al. | 528/26 |
| 2003/0166796 A1 * | 9/2003 | Imaizumi et al. | 525/534 |
| 2006/0069227 A1 * | 3/2006 | Sugo et al. | 528/170 |
| 2006/0183880 A1 * | 8/2006 | Aoki et al. | 528/170 |
| 2008/0090927 A1 * | 4/2008 | Ishii et al. | 522/47 |
| 2009/0075198 A1 * | 3/2009 | Nomura | 430/280.1 |
| 2009/0131620 A1 * | 5/2009 | Sugo et al. | 528/26 |
| 2009/0202831 A1 * | 8/2009 | Honda et al. | 428/383 |
| 2011/0024156 A1 * | 2/2011 | Ando et al. | 174/110 SR |

FOREIGN PATENT DOCUMENTS

| | | |
|---|---|---|
| JP | 62-127361 | 6/1987 |
| JP | 05-130759 | 5/1993 |
| JP | 07302968 A * | 11/1995 |
| JP | 10334735 A * | 12/1998 |
| JP | A-2001-093340 | 4/2001 |
| JP | A-2002-056720 | 2/2002 |
| JP | 2003-016846 | 1/2003 |
| JP | A-2007-005174 | 1/2007 |
| JP | 2007246920 A * | 9/2007 |

* cited by examiner

1 INSULATED WIRE
2 CONDUCTOR
3 INSULATING FILM (PHENOLIC HYDROXYL GROUP-CONTAINING POLYIMIDE RESIN)

21 INSULATED WIRE
2
22 INTERMEDIATE FILM
3

INSULATED WIRE AND INSULATING VARNISH USED THEREFOR

The present application is based on Japanese Patent Application No. 2008-032148 filed on Feb. 13, 2008, the entire contents of which are incorporated herein by reference.

BACKGROUND OF THE INVENTION

1. Field of the Invention

The present invention relates to an insulated wire used for electrical equipments such as a motor or a transformer and, in particular, to an insulated wire with an insulating film formed by coating and baking an insulating varnish of a phenolic hydroxyl group-containing polyimide resin on a conductor.

2. Related Art

An enameled wire, which is a kind of an insulated wire, is formed by coating and baking an enamel on a conductor. A coil for electrical equipments obtained by coiling this enameled wire is broadly and practically used for large capacity or large size heavy electrical machinery. Furthermore, in recent years, the enameled wire is more likely to be used by high-voltage inverter control along with downsizing and high performance of the electrical equipments.

In general, an enameled wire is provided with an insulating film of insulating varnish on a conductor. When an electrical equipment such as a motor or a transformer (a voltage inverter) or the like is produced using this enameled wire, a major method is generally conducted such that the enameled wire is continuously wound into a coiled shape around a slot of a core (a magnetic core) of the motor or that the enameled wire wound in a coiled shape is engaged/inserted with/into the slot.

Meanwhile, in case of an enameled wire with a large cross-sectional area, namely, a large outer diameter, or an enameled wire having a rectangular conductor, not a method to form a long coil with many turns of wire by continuously coiling the enameled wire, but a method to form a long coil by forming a plurality of short small diameter coils with few turns of wire and connecting terminals of the enameled wire of these small diameter coils by welding (for example, electrical welding), has been proposed. The coil formed as above is used as a coil for small size electrical equipments requiring high-density magnetic flux, for example, a coil of an electric generator of a vehicle.

For a coil used for an electric generator of a vehicle, a double coated wire provided with a polyamide-imide insulating film formed by coating and baking insulating varnish composed of a polyamide-imide resin around a polyester imide insulating film which is formed by coating and baking insulating varnish composed of a polyester imide resin around a conductor or a single coated wire provided with an insulating film formed by coating and baking insulating varnish composed of a polyamide-imide resin around a conductor are mainly used.

Furthermore, in part, a double coated wire of which heat resistance and mechanical strength are improved by forming a polyimide insulating film by coating and baking insulating varnish composed of a polyimide resin around a conductor and providing an insulating film by coating and baking insulating varnish composed of a polyamide-imide resin around the polyimide insulating film, is used (for example, disclosed by JP-A-5-130759).

Furthermore, insulating varnish containing a saturated polyester resin and a resol-type phenolic resin is used for improving thermochromism (for example, disclosed by JP-A-62-127361).

In the meantime, although a polyamide-imide enameled wire and a polyimide enameled wire are heavily used as a heat-resistant enameled wire due to a high continuous heat resistance category such as 180-220° C. class, permittivity of the polyamide-imide insulating film or the polyimide insulating film is high due to its polar character while having high heat resistance. Furthermore, there was a problem in that the permittivity or a dielectric loss tangent is high due to high water absorption.

In case of the inverter control, high surge voltage generated from an inverter enters a motor and exerts a bad influence on a motor insulation system. When an insulation property between enameled wires wound in a coiled shape is not enough, the deterioration of the insulating layer is accelerated by corona discharge. In case of being over corona inception voltage of an insulating film against inverter surge voltage at the time of such high-frequency voltage application, the corona discharge is not generated and the operating life lasts long.

Thickening of the insulating film and lowering of permittivity are included as a method to raise the corona inception voltage.

Concretely, it is known that an enameled wire having low water absorption and excellent dielectric property is obtained by forming an insulating film by coating and baking insulating varnish formed by dissolving a phenol compound into an aromatic polyester resin around a conductor (for example, disclosed by JP-A-2003-16846).

Furthermore, in order to lower the permittivity of the insulating film, it has been suggested to coat and bake insulating varnish of fluorine system polyimide resin on the surface of the conductor.

However, the conventional insulating film has the problems that harmful fluorine system gas is generated during high-temperature baking despite low permittivity thereof, and low adhesiveness to the conductor of the insulating film may cause a loose part between the conductor and the insulating film, so that insulation breakdown may occur at low voltage during the voltage application.

Furthermore, the thickening of the insulating film is not preferable from the viewpoint of a lamination factor since it greatly affects to a motor design such that the motor grows in size.

THE SUMMARY OF THE INVENTION

Therefore, it is an object of the invention to provide an insulated wire that can effectively prevent the corona discharge occurrence in high-frequency region as well as securing heat resistance and high adhesiveness, and insulating varnish used therefor.

(1) According to one embodiment of the invention, an insulated wire comprises:
 a conductor; and
 an insulating film formed by coating and baking an insulating varnish on the conductor directly or via an other insulation layer,
 wherein the insulating varnish comprises a phenolic hydroxyl group-containing polyimide resin represented by a chemical formula (1):

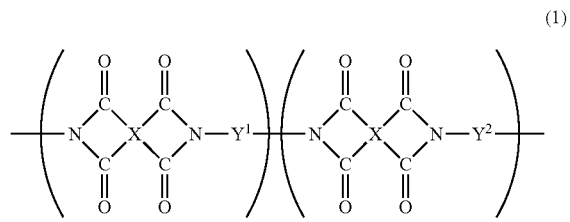

where X is a tetravalent aromatic group composing an aromatic tetracarboxylic dianhydride residue, $Y^1$ is a divalent aromatic group including one or more phenolic hydroxyl groups and $Y^2$ is a divalent aromatic group not including a phenolic hydroxyl group, and a ratio of the number Z1 of phenolic hydroxyl groups included in $Y^1$ of the chemical formula (1) to the number Z2 of an imide group included in the chemical formula (1) is $0.15 \leq Z1/Z2 \leq 0.85$.

In the above embodiment (1), the following changes and modifications can be made.

(i) The phenolic hydroxyl group-containing polyimide resin satisfies $0.1 \leq Y^1/Y^2 \leq 5$ where $Y^1/Y^2$ is a mole ratio of $Y^1$ to $Y^2$ in the chemical formula (1).

(ii) The other insulation layer is an intermediate film comprising a silane coupling agent.

(2) According to another embodiment of the invention, an insulating varnish comprises:

a phenolic hydroxyl group-containing polyimide resin represented by a chemical formula (1):

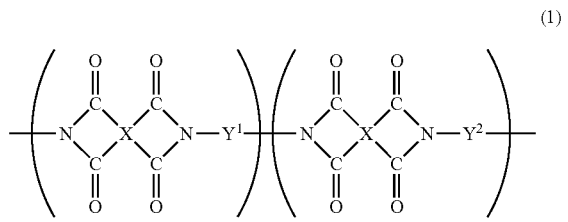

where X is a tetravalent aromatic group composing an aromatic tetracarboxylic dianhydride residue, $Y^1$ is a divalent aromatic group including one or more phenolic hydroxyl groups and $Y^2$ is a divalent aromatic group not including a phenolic hydroxyl group, and a ratio of the number Z1 of phenolic hydroxyl groups included in $Y^1$ of the chemical formula (1) to the number Z2 of an imide group included in the chemical formula (1) is $0.15 \leq Z1/Z2 \leq 0.85$.

In the above embodiment (2), the following changes and modifications can be made.

(iii) The phenolic hydroxyl group-containing polyimide resin satisfies $0.1 \leq Y^1/Y^2 \leq 5$ where $Y^1/Y^2$ is a mole ratio of $Y^1$ to $Y^2$ in the chemical formula (1).

In the above embodiments (1) and (2), the following changes and modifications can be made.

(iv) The aromatic tetracarboxylic dianhydride residue comprises pyromellitic dianhydride (PMDA).

(v) $Y^1$ comprises 3,3'-diamino-4,4'-dihydroxybiphenyl (HOAB), and $Y^2$ comprises 3,4'-diaminodiphenyl ether (DDE).

BRIEF DESCRIPTION OF THE DRAWINGS

Next, the present invention will be explained in more detail in conjunction with appended drawings, wherein.

DESCRIPTION OF THE PREFERRED EMBODIMENTS

Preferred embodiments according to this invention will be explained in more detail in conjunction with the appended drawings.

Figure 1:
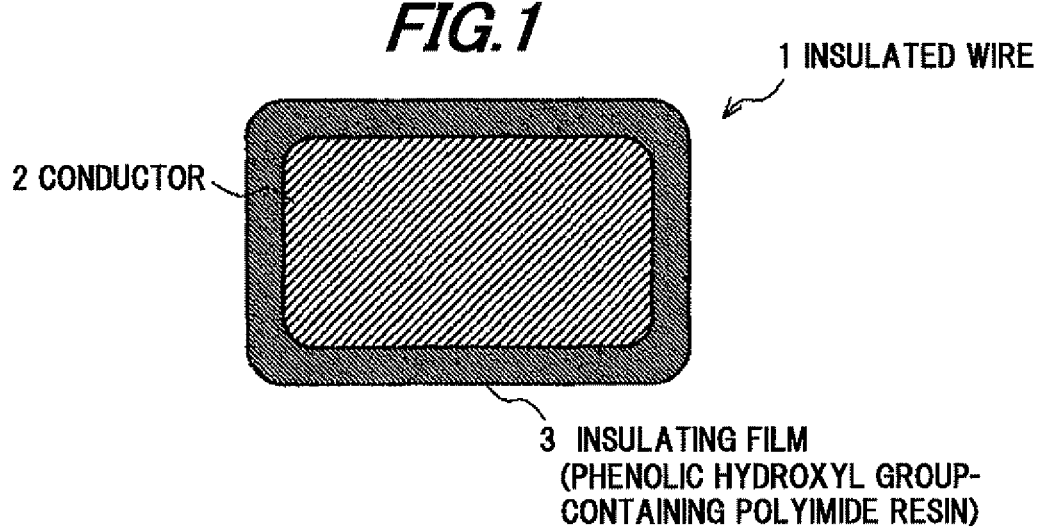
FIG. 1 is a transverse sectional view showing an insulated wire in a first preferred embodiment according to the present invention.

FIG. 1 is a transverse sectional view showing an insulated wire in a first preferred embodiment according to the present invention.

As shown in FIG. 1, an insulated wire 1 according to the first preferred embodiment is a one-layered insulating film structure provided with a phenolic hydroxyl group-containing polyimide resin insulating film 3 directly on a conductor 2.

In the first preferred embodiment, a rectangular copper conductor of which horizontal section is formed in a substantially rectangular shape is used as the conductor 2. The phenolic hydroxyl group-containing polyimide resin insulating film 3 is formed by coating and baking insulating varnish composed of a phenolic hydroxyl group-containing polyimide resin represented by the above-mentioned chemical formula (1).

The insulating varnish composed of the phenolic hydroxyl group-containing polyimide resin is obtained as liquid insulating varnish by mixing tetracarboxylic dianhydrides (described later), phenolic hydroxyl group-containing diamine, aromatic diamine and/or aliphatic diamine to be synthesized in a solvent.

Therefore, when synthesizing the phenolic hydroxyl group-containing polyimide resin in a solvent, it is preferable to use a solvent which has excellent compatibility with the phenolic hydroxyl group-containing polyimide resin.

The solvent used for this synthetic reaction is not specifically limited as long as it allows the phenolic hydroxyl group-containing polyimide resin as a reactive product to be dissolved, and can be, for example, aprotic polar solvents such as N-methyl-2-pyrrolidone, N,N-dimethylacetamide, N,N-dimethylformamide, dimethylsulfoxide or Y-butyrolactone etc. and these solvents may be used independently or being mixed two or more.

Furthermore, in general, the used amount of the solvent is preferably the amount that a total amount of the tetracarboxylic dianhydride and a diamine compound is 0.1-40% by weight of the whole quantity of the reaction solution. The solvent can include a poor solvent of polyamic acid, i.e., alcohols, ketones, esters, ethers or halogenated hydrocarbons at such a ratio that the polyamic acid to be created does not separate out.

The poor solvent can be, for example, methyl alcohol, ethyl alcohol, isopropyl alcohol, cyclohexanol, ethylene glycol, propylene glycol, 1,4-butanediol, triethylene glycol, ethylene glycol monomethyl ether, acetone, methyl ethyl ketone, methyl isobutyl ketone, cyclohexanone, methyl acetate, acetic ether, butyl acetate, diethyl oxalate, diethyl malonate, diethyl ether, ethylene glycol methyl ether, ethylene glycol ethyl ether, ethylene glycol n-propyl ether, ethylene glycol-i-propyl ether, ethylene glycol n-butyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monomethyl ether acetate, diethylene glycol monoethyl ether acetate, tetrahydrofuran, dichloromethane, 1,2-dichloroethane, 1,4-dichlorobutane, trichloroethane, chlorobenzene, o-dichlorobenzene, hexane, heptane, octane, benzene, toluene, xylene or the like.

X in the above-mentioned chemical formula (1) is a tetravalent aromatic group that composes an aromatic tetracarboxylic dianhydride residue. The aromatic tetracarboxylic dianhydride can be, for example, pyromellitic dianhydride, bis(3,4-dicarboxyphenyl)ether dianhydride, 3,3',4,4'-diphenyl tetracarboxylic dianhydride, 2,2',3,3'-diphenyl tetracarboxylic dianhydride, 2,3',3',4'-diphenyl tetracarboxylic dianhydride, 3,3',4,4'-benzophenone-tetracarboxylic dianhydride, bis(2,3-dicarboxyphenyl)methane dianhydride, 2,2-bis(3,4-dicarboxyphenyl)propane dianhydride, 2,2-bis(3,4-dicarboxyphenyl)perfluoropropane dianhydride, bis(3,4-dicarboxyphenyl)sulfone dianhydride, 1,1'-(3,4-dicarboxyphenyl)tetramethyldisiloxane dianhydride or the like.

$Y^1$ in the chemical formula (1) is a divalent aromatic group containing one or more phenolic hydroxyl groups and it is not specifically limited, however, it is preferably a residue after removing two amino groups from a diamine compound that can form a polyimide precursor reacted with tetracarboxylic acid or a derivative thereof, more preferably, an aromatic ring having a carbon number of 6 to 40 to give heat resistance to a resin precursor.

Here, a group containing the aromatic ring can be a group containing one or more aromatic rings such as a benzene ring, a naphthalene ring or the like.

The phenolic hydroxyl group-containing diamine can be 1,3-diamino-4-hydroxybenzene, 3,3'-diamino-4,4'-dihydroxybiphenyl, 4,4'-diamino-3,3'-dihydroxybiphenyl, bis(3-amino-4-hydroxyphenyl)sulfone, bis(4-amino-3-hydroxyphenyl)sulfone, bis(3-amino-4-hydroxphenyl) hexafluoropropane, bis(4-amino-3-hydroxyphenyl) hexafluoropropane, bis(3-amino-4-hydroxyphenyl)propane, bis(4-amino-3-hydroxyphenyl)propane, 4,6-diaminoresorcinol, 4,5-diaminoresorcinol or the like.

$Y^2$ in the chemical formula (1) is a divalent aromatic group not containing the phenolic hydroxyl group and can be, for example, an aromatic diamine.

The aromatic diamine can be 1,4-diaminobenzene, 1,3-diaminobenzene, 4,4'-diaminodiphenyl methane, 4,4'-diaminodiphenyl ether, 3,4'-diaminodiphenyl ether, 4,4'-diaminobenzophenone, 3,3'-diaminobenzophenone, 4,4'-bis(4-aminophenyl)sulfide, 4,4'-diaminodiphenyl sulfone, 4,4'-diamino benzanilide, 1,4-bis(4-aminophenoxy)benzene, 1,3-bis(4-aminophenoxy)benzene, 1,3-bis(3-aminophenoxy) benzene.

It is preferable that the ratio of the number Z1 of phenolic hydroxyl groups contained in $Y^1$ as indicated in the chemical formula (1) to the number Z2 of an imide group included in the chemical formula (1) is in the range of $0.15 \leq Z1/Z2 \leq 0.85$. When Z1/Z2 is less than 0.15, the adhesive strength with copper is low. When Z1/Z2 is over 0.85, though the adhesive strength with copper is high, the permittivity is high and the breakdown voltage is low, so that the prevention effect against the corona discharge occurrence or insulation breakdown is significantly reduced.

Furthermore, for the phenolic hydroxyl group-containing polyimide resin, a mole ratio (i.e., $Y^1/Y^2$) of $Y^1$ to $Y^2$ in the chemical formula (1) is preferably in the range of $0.1 \leq Y^1/Y^2 \leq 5$.

When $Y^1/Y^2$ is less than 0.1, since a loose part is generated due to a low adhesive strength with copper, the appearance after applying a voltage at 500 kV/mm is defective. Furthermore, when $Y^1/Y^2$ is over 5, since the permittivity becomes high and the corona inception voltage becomes low, the breakdown voltage is reduced so that the appearance after applying a voltage at 500 kV/mm is defective.

As used in the insulated wire 1 of the first preferred embodiment, the phenolic hydroxyl group-containing polyimide resin insulating film 3 is formed by directly coating and baking the insulating varnish composed of the phenolic hydroxyl group-containing polyimide resin as indicated in the chemical formula (1) on the conductor 2.

The phenolic hydroxyl group-containing polyimide resin of this embodiment has lower permittivity or dielectric loss tangent than the polyamide-imide resin or polyimide resin which is broadly used as a conventional insulating film material.

Thus, the insulated wire 1 can have an insulating film of the phenolic hydroxyl group-containing polyimide resin insulating film 3 lower in permittivity than the insulating film of the conventional general enameled wire, so that it is possible to reduce erosion of the insulating film caused by an inverter surge (i.e., the inverter surge is high).

Additionally, the phenolic hydroxyl group-containing polyimide resin insulating film 3 also has a high adhesiveness with the conductor 2 and a high heat resistance, and it is excellent in prevention effect against the corona discharge occurrence or insulation breakdown in high-frequency region.

Therefore, the insulated wire 1 is a preferable insulated wire, especially, for a coil of a motor, a transformer or the like.

Furthermore, it is possible to add a silane coupling agent to the composition of the insulated wire 1 of FIG. 1 in order to improve the adhesiveness of the conductor 2 with the phenolic hydroxyl group-containing polyimide resin insulating film 3 if necessary.

Figure 2:
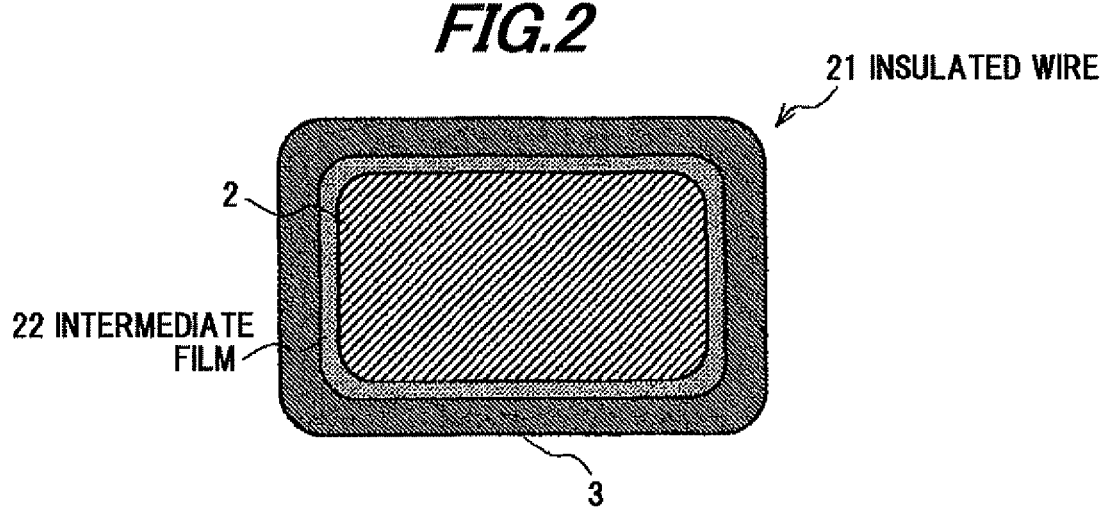
FIG. 2 is a transverse sectional view showing an insulated wire in a second preferred embodiment according to the present invention.

For example, an insulated wire 21 of the second preferred embodiment shown in FIG. 2 can be composed such that the phenolic hydroxyl group-containing polyimide resin insulating film 3 is, as another insulator layer, formed on an intermediate film (i.e., an inner-layer insulating film) 22 formed on the conductor 2. The intermediate film 22 is a thin film of a silane coupling agent.

The silane coupling agent is not limited as long as it has a property to absorb onto hollow silica. The silane coupling agent can be preferably 3-glycidoxypropylmethoxysilane, 3-methacryloxypropyltrimethoxysilane, 3-acryloxypropyltrimethoxysilane, 3-aminopropyltrimethoxysilane, N-2-(aminoethyl)-3-aminopropyltrimethoxysilane, 3-mercaptopropyltrimethoxysilane or the like, however, it is not limited thereto.

EXAMPLES

An insulated wire with an insulating film formed by coating and baking an insulating varnish composed of a phenolic hydroxyl group-containing polyimide resin of the present invention will be detailed in Examples as below.

Example 1

A ball cooling tube provided with a trap having a silicon cock was installed to a 1000 mL separable three-necked flask to which a stirrer is installed. 21.81 g of pyromellitic dianhydride (PMDA: molecular weight (M.W.)=218.12), 10.81 g of 3,3'-diamino-4,4'-dihydroxybiphenyl (HOAB: molecular weight=216.24), 10.02 g of 3,4'-diaminodiphenyl ether (DDE: molecular weight=200.24) and 170.56 g of N-methyl-2-pyrrolidone were added, temperature was raised to 180° C. and reaction was continued for 5 hours. The rotation speed was initially set to be 250 rpm, and then, appropriately lowered as the reaction slowed down. The water created during the reaction was removed through the silicon cock. Then, insulating varnish composed of a phenolic hydroxyl group-containing polyimide resin was obtained by vacuum drying.

An inner-layer insulating film of 1 μm was provided by coating 1% aqueous solution of 3-aminopropyltrimethoxysilane (KBE-903 manufactured by Shin-Etsu Chemical Co., Ltd.) on a rectangular copper conductor and heating at 100° C. for 5 minutes by an infrared heating furnace. The phenolic hydroxyl group-containing polyimide resin insulating film 3 of 30 μm in film thickness was provided by baking after coating the insulating varnish composed the phenolic hydroxyl group-containing polyimide resin around this inner-layer insulating film. As a result, an enameled wire (the insulated wire 21) was manufactured that is 31 μm in thickness of the whole insulating film.

Example 2

A ball cooling tube provided with a trap having a silicon cock was installed to a 1000 mL separable three-necked flask to which a stirrer is installed. 21.81 g of PMDA, 17.30 g of HOAB, 4.00 g of DDE and 172.44 g of N-methyl-2-pyrrolidone were added, temperature was raised to 180° C. and reaction was continued for 5 hours. The rotation speed was initially set to be 250 rpm, and then, appropriately lowered as the reaction slowed down. The water created during the reaction was removed through the silicon cock. Then, insulating varnish composed of a phenolic hydroxyl group-containing polyimide resin was obtained by vacuum drying. An inner-layer insulating film of 1 μm was provided by coating 1% aqueous solution of 3-aminopropyltrimethoxysilane (KBE-903 manufactured by Shin-Etsu Chemical Co., Ltd.) on a rectangular copper conductor and heating at 100° C. for 5 minutes by an infrared heating furnace. The phenolic hydroxyl group-containing polyimide resin insulating film 3 of 30 μm in film thickness was provided by baking after coating the insulating varnish composed of the phenolic hydroxyl group-containing polyimide resin around this inner-layer insulating film. As a result, an enameled wire (the insulated wire 21) was manufactured that is 31 μm in thickness of the whole insulating film.

Example 3

A ball cooling tube provided with a trap having a silicon cock was installed to a 1000 mL separable three-necked flask to which a stirrer is installed. 21.81 g of PMDA, 3.60 g of HOAB, 16.87 g of DDE and 169.12 g of N-methyl-2-pyrrolidone were added, temperature was raised to 180° C. and reaction was continued for 5 hours. The rotation speed was initially set to be 250 rpm, and then, appropriately lowered as the reaction slowed down. The water created during the reaction was removed through the silicon cock. Then, insulating varnish composed of a phenolic hydroxyl group-containing polyimide resin was obtained by vacuum drying. An inner-layer insulating film of 1 μm was provided by coating 1% aqueous solution of 3-aminopropyltrimethoxysilane (KBE-903 manufactured by Shin-Etsu Chemical Co., Ltd.) on a rectangular copper conductor and heating at 100° C. for 5 minutes by an infrared heating furnace. The phenolic hydroxyl group-containing polyimide resin insulating film 3 of 30 μm in film thickness was provided by baking after coating the insulating varnish composed of the phenolic hydroxyl group-containing polyimide resin around this inner-layer insulating film. As a result, an enameled wire (the insulated wire 21) was manufactured that is 31 μm in thickness of the whole insulating film.

Comparative Example 1

A ball cooling tube provided with a trap having a silicon cock was installed to a 1000 mL separable three-necked flask to which a stirrer is installed. 21.81 g of PMDA, 1.03 g of HOAB, 19.07 g of DDE and 167.64 g of N-methyl-2-pyrrolidone were added, temperature was raised to 180° C. and reaction was continued for 5 hours. The rotation speed was initially set to be 250 rpm, and then, appropriately lowered as the reaction slowed down. The water created during the reaction was removed through the silicon cock. Then, insulating varnish composed of a phenolic hydroxyl group-containing polyimide resin was obtained by vacuum drying. An inner-layer insulating film of 1 μm was provided by coating 1% aqueous solution of 3-aminopropyltrimethoxysilane (KBE-903 manufactured by Shin-Etsu Chemical Co., Ltd.) on a rectangular copper conductor and beating at 100° C. for 5 minutes by an infrared heating furnace. The phenolic hydroxyl group-containing polyimide resin insulating film of 30 μm in film thickness was provided by baking after coating the insulating varnish composed of the phenolic hydroxyl group-containing polyimide resin around this inner-layer insulating film. As a result, an enameled wire was manufactured that is 31 μm in thickness of the whole insulating film.

Comparative Example 2

A ball cooling tube provided with a trap having a silicon cock was installed to a 1000 mL separable three-necked flask to which a stirrer is installed. 21.81 g of PMDA, 19.22 g of HOAB, 2.22 g of DDE and 173 g of N-methyl-2-pyrrolidone were added, temperature was raised to 180° C. and reaction was continued for 5 hours. The rotation speed was initially set to be 250 rpm, and then, appropriately lowered as the reaction slowed down. The water created during the reaction was removed through the silicon cock. Then, insulating varnish composed of a phenolic hydroxyl group-containing polyimide resin was obtained by vacuum drying. An inner-layer insulating film of 1 μm was provided by coating 1% aqueous solution of 3-aminopropyltrimethoxysilane (KBE-903 manufactured by Shin-Etsu Chemical Co., Ltd.) on a rectangular copper conductor and heating at 100° C. for 5 minutes by an infrared heating furnace. The phenolic hydroxyl group-containing polyimide resin insulating film of 30 μm in film thickness was provided by baking after coating the insulating varnish composed of the phenolic hydroxyl group-containing polyimide resin around this inner-layer insulating film. As a result, an enameled wire was manufactured that is 31 μm in thickness of the whole insulating film.

Comparative Example 3

A ball cooling tube provided with a trap having a silicon cock was installed to a 1000 mL separable three-necked flask to which a stirrer is installed. 21.81 g of PMDA, 20.02 g of DDE and 167.32 g of N-methyl-2-pyrrolidone were added, temperature was raised to 180° C. and reaction was continued for 5 hours. The rotation speed was initially set to be 250 rpm, and then, appropriately lowered as the reaction slowed down. The water created during the reaction was removed through the silicon cock. Then, insulating varnish composed of a phenolic hydroxyl group-containing polyimide resin was obtained by vacuum drying. An inner-layer insulating film of 1 μm was provided by coating 1% aqueous solution of 3-aminopropyltrimethoxysilane (KBE-903 manufactured by Shin- Etsu Chemical Co., Ltd.) on a rectangular copper conductor and heating at 100° C. for 5 minutes by an infrared heating furnace. The phenolic hydroxyl group-containing polyimide resin insulating film of 30 μm in film thickness was provided by baking after coating the insulating varnish composed of the phenolic hydroxyl group-containing polyimide resin around this inner-layer insulating film. As a result, an enameled wire was manufactured that is 31 μm in thickness of the whole insulating film.

Table 1 shows evaluation results of the insulating varnish and the insulating film in Examples 1 to 3 and Comparative Examples 1 to 3. Each evaluation was based on the following (1) to (5).

(1) Adhesive strength of copper: An adhesive strength was evaluated by measuring peel strength of a strip specimen of 10 mm in width by a TENSILON (registered trademark) measuring machine after coating and baking a polyimide resin on a copper substrate for an adhesive strength evaluation.

(2) Permittivity: Permittivity at a frequency of 10 GHz of a strip specimen of 2 mm×100 mm formed into film was measured using an air-conditioning resonator perturbation method (S-Parameter Network Analyzer 8720ES manufactured by Agilent Technologies).

(3) Breakdown voltage: Voltage at the time of breakdown was measured by sandwiching an enamel film between 30 mmΦ of parallel brass-plate electrodes, and applying voltage that increases at a rate of 0.5 kV/min from the initial voltage of 1 kV.

(4) 5% by weight decrease temperature: A film with a weight of 10 mg was made by using the insulating varnish thus obtained. The film was placed in a platinum sample pan and a thermal analysis was conducted by using a thermo gravimetry/differential thermal analyzer TG/DTA320 (manufactured by Seiko Instruments Inc.) in the range of ambient temperature to 800° C. where the conditions were in the air, 100 ml/min in gas flow rate and 10° C./min in rate of temperature rise. Temperature when the film decreased 5% by weight was determined as "5% by weight decrease temperature".

(5) Appearance after applying voltage at 500 kV/mm: The enameled wire (31 μm in thickness of the whole insulating film) thus obtained was sandwiched between 30 mmΦ of parallel brass-plate electrodes, and voltage was applied that increases at a rate of 0.5 kV/min from the initial voltage application of 1 kV to 15.5 kV. Then, the appearance of the insulating film was checked whether a crack is observed by a scanning electron microscope.

It will be appreciated that, as compared to the insulated wire of Comparative Example 3 with the insulating film of the conventional phenolic hydroxyl group-containing polyimide resin, the insulated wires 21 of Examples 1 to 3 with the insulating film of the phenolic hydroxyl group-containing polyimide resin according to the present invention have heat resistance and permittivity equivalent to the conventional insulated wire and improved adhesiveness to copper of the insulating film. Furthermore, it will be appreciated that the insulated wires 21 of Examples 1 to 3 are superior to the conventional insulated wire in prevention effect against the corona discharge occurrence or insulation breakdown in view of data of the breakdown voltage or the appearance after applying voltage at 500 kV/mm.

In Comparative Example 1, although the phenolic hydroxyl group-containing polyimide resin of the same composition as Examples 1 to 3 is used, adhesiveness to copper of the insulating film is inferior since Z1/Z2 is less than 0.15 that is the ratio of the number Z1 of phenolic hydroxyl groups contained in $Y^1$ to the number Z2 of imide group.

In Comparative Example 2, although adhesiveness to copper of the insulating film and heat resistance thereof are equivalent to Examples 1 to 3, the prevention effect against the corona discharge occurrence is not enough since Z1/Z2 is over 0.85 that is the ratio of the number Z1 of phenolic hydroxyl groups contained in $Y^1$ to the number Z2 of imide group, so that permittivity is high and roughness occurs in the appearance after applying voltage at 500 kV/mm.

Although the invention has been described with respect to the specific embodiments for complete and clear disclosure, the appended claims are not to be therefore limited but are to be construed as embodying all modifications and alternative constructions that may occur to one skilled in the art which fairly fall within the basic teaching herein set forth.

What is claimed is:

1. An insulated wire, comprising:

a conductor; and an insulating film formed by coating and baking an insulating varnish on the conductor directly or via an other insulation layer, wherein the insulating varnish is a phenolic hydroxyl group-containing polyimide resin represented by a chemical formula (I):

TABLE 1

| Item | Acid X | Amine | | $Y^1/Y^2$ (mole ratio) | Z1/Z2 | Adhesive strength to copper (N/cm) | Permittivity | 5% by weight decrease temperature (° C.) | Breakdown voltage (kV/mm) | Appearance after applying voltage at 500 kV/mm |
| | | $Y^1$ | $Y^2$ | | | | | | | |
|---|---|---|---|---|---|---|---|---|---|---|
| Example 1 | PMDA | HOAB | DDE | 1 | 0.50 | 4.3 | 3.0 | 442 | 584 | Good |
| Example 2 | PMDA | HOAB | DDE | 5 | 0.85 | 4.4 | 3.0 | 446 | 571 | Good |
| Example 3 | PMDA | HOAB | DDE | 0.1 | 0.15 | 4.0 | 3.0 | 441 | 563 | Good |
| Comparative Example 1 | PMDA | HOAB | DDE | 0.05 | 0.05 | 1.6 | 3.0 | 435 | 522 | Rough |
| Comparative Example 2 | PMDA | HOAB | DDE | 8 | 0.89 | 4.4 | 3.2 | 442 | 512 | Rough |
| Comparative Example 3 | PMDA | — | DDE | 0 | 0 | 1.2 | 3.0 | 445 | 478 | — |

PMDA: M.W. = 218.12, HOAB: M.W. = 216.24, DDE: M.W. = 200.24

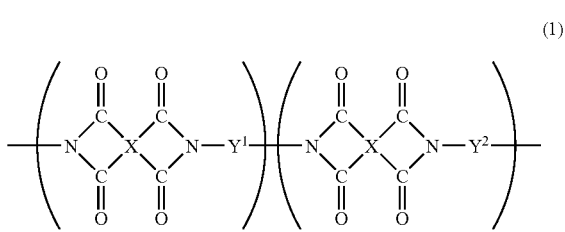

(1)

where X is a tetravalent aromatic group composing an aromatic tetracarboxylic dianhydride residue, $Y^1$ is a residue of a phenolic hydroxyl group-containing diamine that is selected from the group consisting of 1,3-diamino-4-hydroxybenzene, 3,3'-diamino-4,4'-dihydroxybiphenyl, 4,4'-diamino-3,3'-dihydroxybiphenyl, bis(3-amino-4-hydroxyphenyl)sulfone, bis(4-amino-3-hydroxyphenyl)sulfone, bis(3-amino-4-hydroxphenyl)hexafluoropropane, bis(4-amino-3-hydroxyphenyl)hexafluoropropane, bis(3-amino-4-hydroxyphenyl)propane, bis(4-amino-3-hydroxyphenyl)propane, 4,6-diaminoresorcinol and 4,5-diaminoresorcinol, and $Y^2$ is a residue of a diamine not including a phenolic hydroxyl group that is selected from the group consisting of 1,4diaminobenzene, 1,3-diaminobenzene, 4,4'-diaminodiphenyl methane, 4,4'-diaminodiphenyl ether, 3,4'-diaminodiphenyl ether, 4,4'-diaminobenzophenone, 3,3'-diaminobenzophenone, 4,4'-bis(4-aminophenyl)sulfide, 4,4'-diaminodiphenyl sulfone, 4,4'-diamino benzanilide, 1,4-bis(4-aminophenoxy)benzene, 1,3-bis(4-aminophenoxy)benzene and 1,3-bis(3-aminophenoxy)benzene, and a ratio of the number Z1 of phenolic hydroxyl groups included in $Y^1$ of the chemical formula (1) to the number Z2 of an imide group included in the chemical formula (1) is $0.15 \leq Z1/Z2 \leq 0.85$.

2. The insulated wire according to claim 1, wherein the phenolic hydroxyl group-containing polyimide resin satisfies $0.1 \leq Y^1/Y^2 \leq 5$ where $Y^1/Y^2$ is a mole ratio of $Y^1$ to $Y^2$ in the chemical formula (1).

3. The insulated wire according to claim 1, wherein the other insulation layer is an intermediate film comprising a silane coupling agent.

4. The insulated wire according to claim 1, wherein the aromatic tetracarboxylic dianhydride residue comprises pyromellitic dianhydride (PMDA).

5. The insulated wire according to claim 1, wherein $Y^1$ comprises 3,3'-diamino-4,4'-dihydroxybiphenyl (HOAB), and $Y^2$ comprises 3,4'-diaminodiphenyl ether (DDE).

6. The insulated wire according to claim 1, wherein X is selected from the group consisting of pyromellitic dianhydride, his (3,4-dicarboxyphenyl)ether dianhydride, 3,3',4,4'-diphenyl tetracarboxylic dianhydride, 2,2',3,3'-diphenyl tetracarboxylic dianhydride, 2,3',3',4'-diphenyl tetracarboxylic dianhydride, 3,3',4,4'-benzophenone-tetracarboxylic dianhydride, his (2,3-dicarboxyphenyl)methane dianhydride, 2,2-bis(3,4-dicarboxyphenyl)propane dianhydride, 2,2-bis(3,4-dicarboxyphenyl)perfluoropropane dianhydride, his (3,4-dicarboxyphenyl)sulfone dianhydride and 1,1'-(3,4-dicarboxyphenyl)tetramethyldisiloxane dianhydride.

* * * * *